United States Patent [19]

West et al.

[11] Patent Number: 5,500,308

[45] Date of Patent: Mar. 19, 1996

[54] ELECTROCHEMICAL CELL HAVING AN INNER SEAL MEMBER

[75] Inventors: Jack T. West; James H. Annen, both of McFarland; Daniel A. Schneider, Madison; Marek K. Kokoszka, Atkinson, all of Wis.

[73] Assignee: Rayovac Corporation, Madison, Wis.

[21] Appl. No.: 236,578

[22] Filed: May 2, 1994

[51] Int. Cl.⁶ .................................................. H01M 2/08
[52] U.S. Cl. ...................... 429/171; 429/174; 29/623.2; 29/623.5; 427/105; 427/231
[58] Field of Search ................... 429/171, 174; 29/623.2, 623.5; 427/231, 239, 105, 398.1

[56] References Cited

U.S. PATENT DOCUMENTS

| | | | |
|---|---|---|---|
| 1,885,786 | 11/1932 | Waitt | 429/171 X |
| 2,169,702 | 8/1939 | Marsal | 136/133 |
| 2,773,926 | 12/1956 | Glover | 136/107 |
| 3,179,537 | 4/1965 | Reilly | 136/133 |
| 3,296,018 | 1/1967 | Sullivan et al. | 427/398.1 X |
| 3,804,663 | 4/1974 | Clark | 427/231 |
| 3,891,463 | 6/1975 | Karobath et al. | 429/171 |
| 3,922,178 | 11/1975 | Winger | 136/133 |
| 4,001,044 | 1/1977 | Miyoshi et al. | 429/166 |
| 4,632,887 | 12/1986 | Jung | 429/181 |
| 4,877,475 | 10/1989 | Uchida et al. | 427/231 |
| 5,079,108 | 1/1992 | Annen et al. | 429/171 |

Primary Examiner—Stephen Kalafut
Attorney, Agent, or Firm—Thomas F. Woods; Thomas D. Wilhelm

[57] ABSTRACT

This invention pertains to electrochemical cells, and specifically to an inner seal member in an electrochemcical cell. The inner seal member is positioned against, and in intimate contact with that portion of the separator which extends above the cathode mix, or a retaining washer on the cathode mix, and is also in intimate contact with the cathode mix or the retaining washer. The seal member is preferably emplaced as a fluid material and is preferably distributed by centrifugal force, by rotating the cell as the sealant material is dispensed into the cell. The inner seal member is effective to retard loss of battery performance over an extended period of storage time, both at room temperature and at elevated temperature. The seal member is a composition of hydrocarbons or fatty acid ester oils having the capacity to remain in full surface-to-surface contact, as it cools, with the surfaces upon which it is placed warm or hot, in the cell.

137 Claims, 8 Drawing Sheets

ELECTROCHEMICAL CELL HAVING AN INNER SEAL MEMBER

FIELD OF THE INVENTION

This invention relates to seals in electrochemical cells capable of protecting the active elements of the cell from being corroded, or otherwise contaminated, or inappropriately used up by elements entering the cell from the outside environment.

BACKGROUND OF THE INVENTION

It is known that encroachment of oxygen into an electrochemical cell causes corrosion of the zinc cathode, and corresponding loss of performance of the cell. It is also known that loss of moisture out of the cell, and consumption of electrolyte by reaction with encroaching oxygen, causes loss of potential electrical performance of the cell.

Generally, the cell of interest includes a metal can as an anode, a cathode comprising manganese dioxide, an electrolyte, a separator, and a current collector. A retaining washer is preferably positioned at the top of, and covering, the cathode mix. Typically the retaining washer is spaced from outer elements of the cell, including any outer seal, by an intervening inner chamber.

Various attempts have been made, and significant research resources have been expended in attempts to control loss of moisture from especially the top of the cell, and to inhibit ingress of oxygen into the cell. Examples of such attempts are shown in the following United States Patents.

U.S. Pat. No. 4,632,887 Jung teaches using an adhesive sealing substance 8 between his carbon rod 9 and a high elasticity (retaining) washer 10.

U.S. Pat. No. 2,773,926 Glover teaches using either asphalt or microcrystalline wax to coat all or a portion of the inner chamber of the cell.

U.S. Pat. No. 5,079,108 Annen et al teach using a heat shrinkable plastic seal strip between (i) the seal washer 12 and the lip 19 of the cell and (ii) the retaining washer 14.

U.S. Pat. No. 3,179,537 Reilly teaches using a wax coating as a seal on the carbon rod and the inner surfaces of his cap 20, and washers 24 and 26.

U.S. Pat. No. 3,922,178 Winger teaches using a fatty polyamide as a type of seal, to protect some interior surfaces of the inner chamber from being wetted by alkaline electrolyte.

U.S. Pat. No. 2,169,702 Marsal teaches placing a seal washer on the interior of the cell, above the retaining washer, then heating the cell in the area of the seal washer in order to melt the seal washer material, and cause it to flow into the desired respective joints of the cell components in the inner chamber. As taught, the cell is inverted before heating in order to cause the heated seal material to flow, and thus be distributed on the bottom surfaces of cap B, cover A, and washer W, namely at the top of the inner chamber.

U.S. Pat. No. 4,001,044 Miyoshi et al teach an interior seal 25 of wax on the retaining washer, and an outer seal 25$a$ at the joints of the carbon rod 12, the plastic plug 14$a$, and the plastic jacket 15$a$. The outer seal can be a variety of materials, including Vaseline.

Despite these advances, dry cells continue to be plagued with an unacceptable degree of moisture loss from of the cell, and ingress of oxygen into the cell. As moisture is lost from the cell, the electrochemical performance of the cell declines. As oxygen enters the cell, it reacts with the electrolyte at the surface of the metal can, causing corrosion of the can, and consumption of the can, thus reducing the effectiveness of the can as an anode.

It is an object of this invention to provide a novel interior seal, in the inner chamber of the cell, which provides a superior barrier to loss of moisture from the cell, and a superior barrier to oxygen ingress into the cell.

It is a further object to provide an interior seal which either covers, or preferably wicks into, the separator above the retaining washer, thus preventing ingress of oxygen through the separator, to the surface of the metal can, and also preventing upward advance of the electrolyte through the separator adjacent the can wall.

It is yet another object to provide an interior seal compound and seal having a first liquid component which covers or wicks into the separator and a second semi-solid component which fixes the position of the compound in the inner chamber on the retaining washer (or cathode mix) and the separator.

It is still another object to provide such an interior seal compound and seal wherein the liquid and semi-solid components have such an affinity for each other that the immobility of the semi-solid component retards the mobility of the liquid component, and thus limits substantially the zone of migration of the liquid component essentially to covering or penetrating the retaining washer and covering or penetrating the separator above the retaining washer or cathode mix.

SUMMARY OF THE DISCLOSURE

Some of the objects are obtained in an electrochemical cell, having an anode comprising a metal can having a top; a cathode comprising a quantity of a cathode mix in the metal can, and a current collector in physical contact with the cathode mix, the current collector having a top and the cathode mix having a top; a separator disposed between the cathode mix and the metal can; one or more top closure members overlying, and spaced from, the cathode mix, thereby creating an inner chamber between the one or more top closure members and the cathode mix; and an inner seal member comprising seal material extending over the top of the cathode mix, and onto, into, and through the separator, above the cathode mix.

In preferred embodiments, the inner seal member extends over the entire top surface of the cathode mix, and over substantially the entire portion of the inner surface of the separator extending above the cathode mix.

The electrochemical cell preferably includes a retaining washer overlying the cathode mix, and disposed between the cathode mix and the inner seal member. Where the retaining washer is used, there is a first joint between the retaining washer and the current collector, and a second joint between the retaining washer and the separator, and the inner seal member extends over the retaining washer, and over both of the first and second joints.

The cathode mix preferably comprises manganese dioxide, preferably selected from the group consisting of electrolytic manganese dioxide, chemical manganese dioxide, battery grade manganese dioxide, metallurgical grade manganese dioxide, and mixtures thereof.

In some embodiments, the metal can is zinc, and the electrolyte comprises zinc chloride, ammonium chloride, or mixtures thereof.

In other embodiments, the cell comprises an anodic metal can comprising magnesium or primarily magnesium, a magnesium perchlorate ($Mg(ClO_4)_2$) electrolyte, and a manganese dioxide cathode.

In still other embodiments, the cell comprises an anodic metal can comprising aluminum or primarily aluminum, an aluminum chloride $AlCl_3$ electrolyte, and a manganese dioxide cathode.

The current collector preferably comprises primarily battery-grade carbon.

The separator typically comprises paper, coated or uncoated, at about 30 to about 70 pounds per 3000 square foot ream, though a variety of other absorbent or semipermeable materials can be used.

The material for the inner seal member is generally selected such that when the inner seal member is applied to surfaces of the retaining washer, the current collector rod, and the separator, at up to 140 degrees F., the inner seal member remains in full contact with those surfaces upon cooling of the seal member to room temperature. Specifically, the seal member does not withdraw from those surfaces as it cools and solidifies (or partially solidifies). Preferably, the seal material comprises a liquid component which is sufficiently mobile at room temperature (e.g. about 70 degrees F.) that the liquid component can bleed through 50 pound per ream kraft paper, at a rate of about ⅛ inch within 12 hours after being placed in the electrochemical cell, thus completing incorporation of the inner seal member into the separator, thereby fully protecting the metal can anode from air ingress and preventing the loss of moisture from the cell.

The seal material also preferably includes a second (solid or semi-solid) component, the second component being immobile at room temperature, the first liquid component having sufficient affinity for the second component that the immobility of the second component, in the fraction used of the second component, is effective to limit the mobility of the first component.

Preferred materials for use as the inner seal member are paraffin oil and petrolatum.

The electrochemical cells of the invention can also be characterized in terms of the inner seal member comprising a compound having about 0.5% to about 100% by weight, preferably 1% to 100%, more preferably 2% to 100%, more preferably yet 5% to 100%, and most preferably 7% to 100% by weight of a first mobile liquid hydrocarbon component effective to penetrate the separator, and about 99.5% to about 0% by weight, preferably 99% to 0%, more preferably 98% to 0%, more preferably yet 95% to 0%, and most preferably 93% to 0% by weight of a second solid or semi-solid hydrocarbon component, the second component being immobile at room temperature, the first component having sufficient affinity for the second component that the immobility of the second component, in the fraction of the second component used, is effective to limit the mobility of the first component, typically limiting the mobility of the first component to covering the top of the cathode mix or retaining washer, and the separator.

Typically, the first liquid component has a viscosity of about 40 Saybolt Universal, Seconds (SUS) at 100° F.; and the second component has a viscosity greater than the viscosity of the first component, but no more than about 200 SUS at 210° F.

The electrochemical cells of the invention can further be characterized in terms of the inner seal member comprising a sealant compound comprising a first mobile liquid hydrocarbon component having a first molecular weight, and a second immobile solid or semi-solid hydrocarbon component having a second molecular weight higher than the first molecular weight. Again, the first component has sufficient affinity for the second component that the immobility of the second component is effective to limit the mobility of the first component.

Still another way of characterizing the electrochemical cells of the invention is in terms of the inner seal member comprising a compound having a first mobile liquid hydrocarbon component comprising predominantly hydrocarbon or fatty acid ester oil molecules having 12–30 carbon atoms, and a second immobile solid or semi-solid component comprising predominantly hydrocarbon or fatty acid ester molecules having 25–150 carbon atoms, and most preferably 30–70 carbon atoms.

Yet further, the electrochemical cells of the invention can be characterized in terms of the composition of the inner seal member comprising a first liquid component and a second solid or semi-solid component, and being selected from the group consisting of paraffin oil and petrolatum, and compositions wherein the first component is selected from the group consisting of paraffin oil, lubricating oil, motor oil, linseed oil, butter, coconut oil, beef tallow, palm oil, soybean oil, palm kernel oil, cod liver oil, tung oil, cottonseed oil, corn oil, peanut oil, olive oil, safflower oil, and canola oil, and preferably wherein the second component is selected from the group consisting of paraffin wax, lard, polyunsaturated vegetable oil, animal fat, gear grease, bitumen, and asphalt.

The invention applies both to the standard single cell batteries, e.g. AAA size, AA size, C size, and D size batteries, and to batteries made by wiring together, in series or parallel, at least two electrochemical cells, such as 4 cells wired in series to make a 6-volt lantern battery.

The invention further comprehends a method of making an electrochemical cell having a metal can anode, the metal can anode having a bottom, an open top, and an inner circumference. The method comprises the steps of placing a separator in the metal can, the separator having a top extending about the inner circumference of the can; placing, in the metal can, a cathode comprising a cathode mix and a current collector rod, the current collector rod having a length extending between the top and the bottom of the metal can, the cathode mix having a top below the top of the separator, and thereby forming a first joint between the cathode mix, or a retaining washer, and the current collector rod, and a second joint between the cathode mix, or retaining washer, and the separator, both the current collector rod and the separator extending above the top of the cathode mix; placing a sealant material onto the current collector rod at the top of the cathode mix, or retaining washer, while rotating the metal can and its contents about an axis extending along the length of the current collector rod, thereby placing a bead of the sealant material around the current collector rod; and rotating the metal can about the axis sufficiently fast that the sealant material is distributed, by centrifugal force, across the cathode mix or retaining washer, across the second joint at the separator, and onto the separator above the top of the cathode mix.

The method preferably includes heating the sealant material to at least 110 degrees F. prior to dispensing it into the cell, and cooling the sealant material to room temperature within 10 seconds of the distribution of the sealant material by centrifugal force, preferably immediately upon substantial completion of the effect of the centrifugal force upon the sealant material.

Typically, the separator has a circumference corresponding generally to the inner circumference of the metal can anode, and, during the distribution of the sealant material by centrifugal force, the sealant material is distributed to within about 1/8 inch of the top of the separator, and about the circumference of the separator.

Preferably, the composition of the sealant material is selected such that the sealant material can bleed, either over the surface of the separator, or through interstices in the separator, to the top of the separator, at room temperature within 12 hours of the distributing of the sealant material into the cell.

In preferred embodiments, the method includes placing a retaining washer in physical contact with the top of the cathode mix, and disposed between the cathode mix and the inner seal member.

Finally, the invention contemplates a method of using an electrochemical cell, comprising discharging an electrochemical cell having an anode comprising a metal can having a top; a cathode comprising a quantity of a cathode mix in the metal can, and a current collector rod in physical contact with the cathode mix, the current collector rod having a top and the cathode mix having a top; a separator disposed between the cathode mix and the metal can; one or more top closure members overlying, and spaced from, the cathode mix, and thereby creating an inner chamber between the one or more top closure members and the cathode mix; and an inner seal member comprising seal material extending over the top of the cathode mix or retaining washer, and onto the separator, above the cathode mix.

DETAILED DESCRIPTION OF THE ILLUSTRATED EMBODIMENTS

Figure 1:
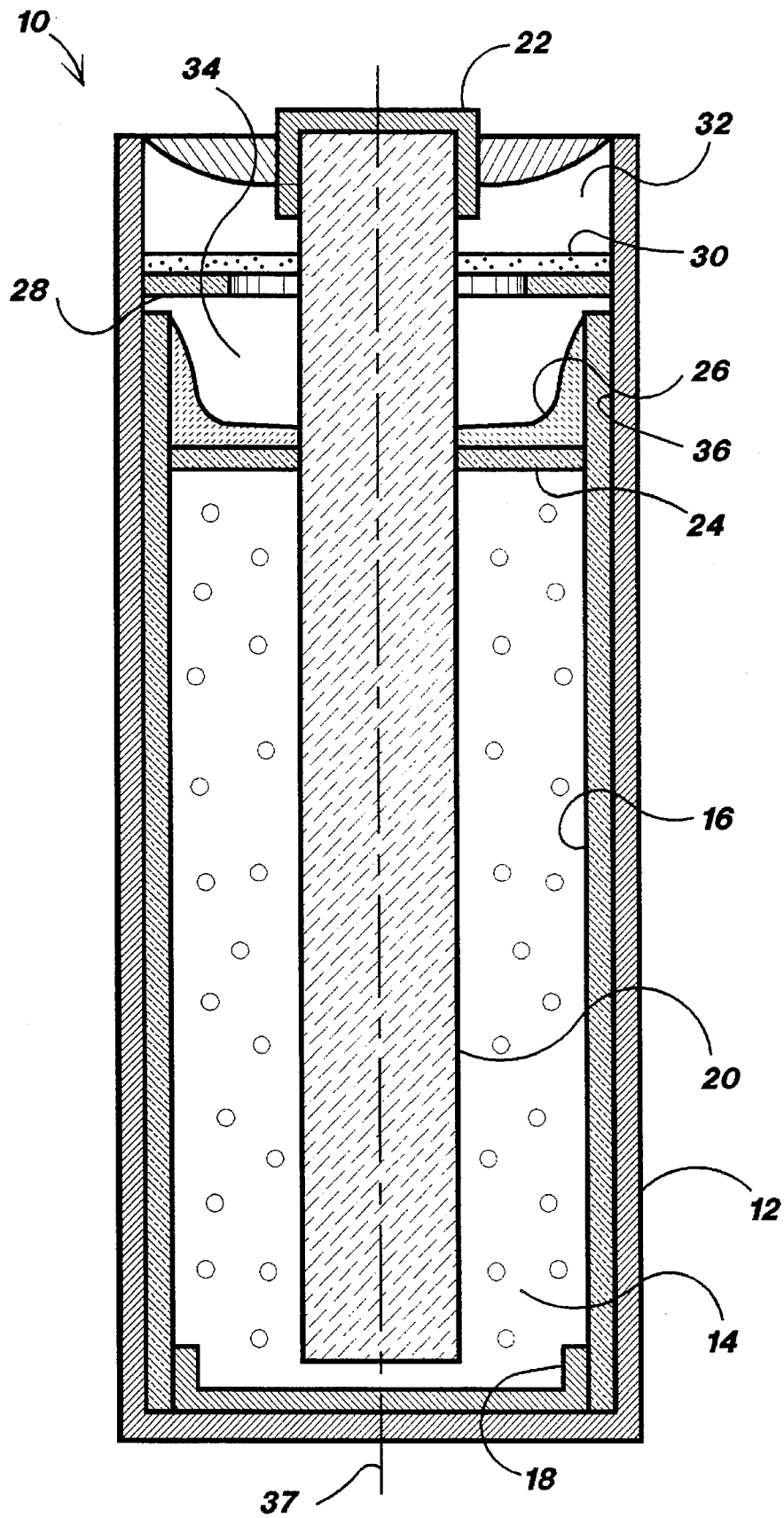
FIG. 1 shows a cross-section of an elevation view of an electrochemical cell of the invention.

Referring now to the drawings, an electrochemical cell 10 of the invention is generally contained in a zinc can 12 which also serves as the anode of the cell. A quantity of cathode mix 14 is contained in the zinc can. A separator 16 extends about the inner circumference of the zinc can 12, from the bottom of the can to a locus above the top of the cathode mix. A small bottom cup 18 in the bottom of the can separates the zinc can from the cathode mix 14. A carbon rod current collector 20 is in physical contact with the cathode mix 14, and extends from essentially the bottom of the cell to an end cap 22, which extends upwardly beyond the remaining elements of the cell.

A retaining washer 24 is disposed on top of, and in intimate physical contact with, the cathode mix 14, and extends from the separator 16, at its outer periphery, to the carbon rod 20, at its inner periphery. Am inner seal member 26 extends from the carbon rod 20, across the retaining washer 24, and up the inner surface of the separator, to the top of the separator.

A splash shield 28 is positioned above the separator, and an asphalt seal washer 30 is disposed at the top surface of the splash shield 28. A quantity of asphalt seal material 32 is positioned on top of the asphalt seal washer, generally filling the space between the zinc can and the carbon rod (and its cap) above the asphalt washer. The asphalt seal material 32 is recessed from the top of the end cap 22 to facilitate making electrical connection with end cap 22.

The above construction leaves an inner chamber 34, generally located between the bottom of the asphalt seal washer 30 and the top of the inner seal member 26.

The zinc can 12 is typical battery grade zinc. It contains the remaining elements of the cell, as well as serving as the electrical anode of the cell. As is typical with zinc can anodes, the can is susceptible to being corroded as a result of reaction between oxygen and the electrolyte, in the internal environment of the cell. Accordingly, oxygen should be inhibited from contacting elelctrolyte in the vicinity of the zinc can.

The cathode mix 14 can be any of the conventional cathode mixes used in electrochemical cells. Exemplary of such cathode mixes are the manganese dioxides. Such manganese dioxides are well known, by the appellations of e.g. electrolytic manganese dioxide, chemical manganese dioxide, battery grade manganese dioxide, metallurgical grade manganese dioxide, and various mixtures of the above grades of manganese dioxide. A typical cathode mix, by weight, in zinc chloride cells of the invention, is 50% manganese dioxide 30% water 10% zinc chloride 8% carbon black 2% additives including zinc oxide and ammonium chloride.

The separator 16 can be any of the materials conventionally used as separators. A starch-coated kraft paper, e.g. 30–70 pounds per 3000 square foot ream, is preferred. Typically, 50 lb. paper is used. Other absorbent and semipermeable separators can also be used, such as for example, cellulose, cellophane, microporous ion exchange membranes such as Permion® or Celgard® materials. The bottom cup 18 is typically made of the same base material as the separator 16, and is preferably coated with wax.

The carbon rod current collector 20 is conventional semiporous electrode carbon material. As is typical in such electrochemical cells, the porosity of the carbon rod allows egress of gas generated in the cell after assembly of the cell is complete. End cap 22 on the carbon rod is a good electrical conductor, and serves both to protect the end of the rod from physical abuse, and as an electrical connector between the carbon rod and the electrical load circuit.

The retaining washer 24 is for example 150 pound per 3000 square foot ream kraft paper. One purpose of the retaining washer 24 is to retain the cathode mix in position once it is placed in the can 12. Another purpose is to prevent process machinery from coming into contact with the cathode mix after the cathode mix is placed in the can. As will be discussed further hereinafter, the retaining washer 24 can also serve as a base for positioning and distributing the inner seal member 26.

While kraft paper is preferred for the retaining washer, a variety of materials are acceptable, such as, for example, papers and paperboards with or without wax or plastic coatings, cellulose, and permeable, semi-permeable, and impermeable polymers.

And while use of a retaining washer is preferred, as will be seen hereinafter, acceptable electrochemical cells of the invention can be made without a retaining washer, albeit requiring additional quantity of the material of the inner seal member.

The splash shield 28 is made of any of the typical papers, paperboards, and the like which can function to reduce the amount of material that can potentially splash out of the cell during assembly. Use of splash shield 28 is optional, depending on the amount of splash which is anticipated to be encountered when the cathode mix is placed into the cell. We discovered that if the seal material is cooled quickly after application in the cell no splash shield is required.

The asphalt seal washer 30 can be e.g. any of the conventional washer materials as used for retaining washer 24.

The asphalt seal 32, serving generally as a filler and sealer, is disposed on the asphalt seal washer 30, and around the inner circumference of the outer can wall 36, between the can wall and the rod 20. The asphalt seal 32 thus serves as a closure of the cell, generally isolating the physical contents of the cell from the outside environment.

The inner seal member 26, its location, and its composition, are the focus of this invention. The problem addressed in the invention is that the asphalt seal 32, alone, is ineffective to prevent an unacceptable amount of moisture from escaping through or around the asphalt seal 32, and an unacceptable amount of air/oxygen from entering the cell through or around the asphalt seal 32.

Moisture loss causes the cathode mix 14 to dry out. As the cathode mix dries out, it loses a degree of conductivity, and shrinks to a corresponding degree, withdrawing slightly from physical contact with the zinc can and/or the carbon rod. Thus, the intimate contacts between the cathode mix and the carbon rod and zinc can are somewhat degraded, with corresponding degradation in performance of the cell.

The practical affect of air/oxygen entering the cell is that the oxygen reacts with any available electrolyte in the presence of zinc. To the extent oxygen reacts with the electrolyte, the reaction extracts electrons from the zinc can, correspondingly corroding the zinc while consuming electrolyte, all without producing useful electromotive force, which is the purpose of the cell. The end result of the oxygen ingress, and subsequent reaction with electrolyte and zinc, can be early pinholing/puncture of the zinc can at sites where the oxygen can reach, and react with, the zinc, as well as inappropriate consumption of electrolyte.

The applicants have discovered that the zinc is susceptible to attack by oxygen entering the cell at all unprotected areas of the zinc can above the cathode mix 14, and below the asphalt seal washer 30. Applicants have also discovered that the zinc can be protected by hydrocarbon coating materials, so long as the coating material effectively coats both the zinc, and the cathode mix or the retaining washer, and preferably prevents electrolyte from rising above the cathode mix or retaining washer, in or along the separator, and between the separator and zinc can.

Just as important, an effective coating is one that can expand and contract with the cell, by means of a fluid or semi-fluid property of the seal, whereby such dynamic adjustments in the physical size and shape of the seal enable the seal to remain in intimate coverage of the necessary elements on the interior of inner chamber 34.

The inner seal member effectively protects the zinc can and the manganese dioxide where it prevents or inhibits moisture from exiting the cell and prevents oxygen from reaching the zinc can. These combined objectives are attained where the seal member 26 effectively coats the entire upper surface of retaining washer 24 and the entire inner surface of the separator 16 protruding above the cathode mix, as illustrated in e.g. FIG. 1. The seal member 26 is effective where moisture is inhibited from exiting the cell and oxygen is inhibited from attacking the zinc. Accordingly, it is preferred that the seal member 26 cover the entire upper surface of the retaining washer 24 and the entire inner surface of the separator above the retaining washer, and that it permeate any interstices or other openings in the separator. Given appropriate material selection for the seal member 26, as discussed hereinafter, such a coating is effective to inhibit moisture loss, to inhibit electrolyte from rising above the cathode mix, and to inhibit oxygen from reaching the zinc can.

Where the composition of seal member 26 includes a liquid component that can readily bleed into and through the separator, or can otherwise travel along the surface of the separator, as by surface tension, wicking, or other capillary action, then the material of seal member 26 can cover less than all of the separator 16 at the time it is dispensed into the cell. A preferred composition for the seal member 26 is petrolatum, such as Fonoline® Yellow available from the Sonneborn Division of Witco Chemical Company located in Melrose Park, Ill., and mineral jellies which are mixtures of mineral oils, petrolatums and waxes. A good explanation of the composition of petrolatums is found in the McGraw-Hill Encyclopedia of Science & Technology, 7th Edition, at page 284.

The minimum requirement for the seal member 26 is that it have a component which has mobility sufficient to flow dynamically into voids existing or created adjacent the retaining washer, the cathode mix, the separator, and/or the current collector rod. In most cases, the mobile component is a hydrocarbon liquid, such as an oil. As a minimum, paraffin oil, or the like, is an acceptable material for the seal member 26. Typical viscosity for the first liquid component of the seal member is about 40 SUS at 100 degrees F., tested according to ASTM D-445 and ASTM D-2161. Viscosities of the first liquid component of the seal member may be as low as about 35 SUS and as high as about 360 SUS at 100 degrees °F., however, again when tested according to ASTM D-445 and ASTM D-2161.

In preferred embodiments, the seal member 26 also includes, as a second component, a material which is a solid or semi-solid at room temperature, such as a wax, asphalt, lard, or the like. The second component typically is more or less solid (e.g. has a fixed form) at room temperature, and has a melting point only modestly above room temperature, usually below 140 degrees F. Thus, the second component is readily melted by modest heating, whereby the seal member can be dispensed into the cell as a fluid, while under ordinary use conditions, the second component is a solid. Accordingly, the seal member can be injected into the cell as a fluid, as by a nozzle from a hot melt gun, and then cooled to solidify at least the second component of the material.

In some embodiments, the seal material is pliable enough at as low as 87 degrees F. that it can be dispensed into the cell. However, since the preferred compounds used as the second component include a variety of related molecular structures, the second component commonly softens over a range of temperatures, whereby the second component may be a solid at e.g. 70 degrees F., but may have a softened, semi-solid characteristic at e.g. 100–110 degrees F., which is a more common temperature to which batteries are exposed in warmer climates, or for example when left in a closed vehicle. The important characteristic of the second component is that it generally retain its immobility under the conditions to which batteries are exposed during normal use and storage. Thus, the second component should not become completely fluid (e.g. flow freely to conform with the containing container) at less than 100 degrees F. At the same time, it is preferred that the overall composition of the seal member 26 be sufficiently fluid that it can be forced through a nozzle and into the cell at a temperature of about 110 degrees F. A typical viscosity for the second component is 55 to 75 SUS at 210 degrees F., when tested according to ASTM D-445 and ASTM D-2161. Acceptable viscosities for the second compoenent, however, are those exceeding about 30 SUS at 210 degrees F., when tested according to ASTM D-445 and ASTM D-2161.

Use of the second component alone, absent fluid characteristics in the overall seal material, is not satisfactory to accomplish the goals of the invention. Without the ability to flow into interstices of the separator, especially those interstices vacated as minor amounts of liquid electrolyte evaporate, or otherwise vacate the separator, the second component cannot prevent oxygen from penetrating the separator and reaching the inner wall of the zinc can. Accordingly, wax, or the like, alone, is not an acceptable material for use as the material for seal member 26. Rather, enough liquid e.g. paraffin oil, must be incorporated into the wax or other solid/semi-solid component that the liquid can be released into the interstices of the separator as needed, to fill voids created by the departure of electrolyte or any other material.

All the above having been said as a foundation for selecting the composition of the seal member 26, the following are examples of materials suitable for use as the seal member. Paraffin oil, petrolatum, and mineral jellies can be used alone. The paraffin oil illustrates that some oils can be used, as the first liquid component, without necessarily using a second (solid/semi-solid) component. Petrolatum is an example of a mixture of a wax-type semi-solid component with liquid petroleum lubricating oil. Mineral jellies are mixtures of mineral oil, petrolatum, and paraffin wax.

Examples, without limitation, of other materials which can be used as the first liquid component of the seal material 26 include hydrocarbons such as paraffin oil, lubricating oil, and motor oil, and fatty acid esters such as linseed oil, butter, coconut oil, beef tallow, palm oil, palm kernel oil, soybean oil, cod liver oil, tung oil, cottonseed oil, corn oil, peanut oil, olive oil, safflower oil, and canola oil. Typically such materials comprise predominantly linear molecules having 12–30 carbon atoms per molecule.

Examples, without limitation, of other materials which can be used as the second solid/semi-solid component of the seal material 26 include hydrocarbons such as gear grease, paraffin wax, asphalt, and bitumin, and fatty acid esters such as polyunsaturated vegetable oil and animal fats including lard. Typically such materials comprise predominantly linear molecules having 25–150 carbon atoms, and most preferably having 30–70 carbon atoms, per molecule. A good explanation of the composition of asphalt is found in the Encyclopedia of Chemical Technology, by Kirk-Othmer, Fourth Edition, Volume 1, Natural & Synthetic Waxes, at page 706.

While the function of the liquid component is to flow and coat the elements to be protected (the retaining washer and manganese dioxide, and the separator and zinc can) the function of the second (solid/semi-solid) component is to fix the positioning of the seal member 26. Without the second component, the liquid component is fairly free to flow about the inner chamber 34. Lighter ones of the first component liquids tend to dissipate after a short period of time if used without a companion second component. In such cases, the seal member and the corresponding benefit imparted by the seal member, are short-lived. A benefit of a more prolonged nature is achieved by including, in the composition of the seal member, a second solid/semi-solid component. The inventors have found that, where the first liquid component has sufficient affinity for the second component, the mobility of the first component is limited by the immobility of the second component. Namely, the first and second components are preferably selected, in combination, such that the first component will not readily dissipate where it is in contact with the second component. Thus, its affinity for the second component inhibits the tendency of the first component to dissipate prior to the end of the typical use life of the cell.

The positioning of the seal member 26 directly against the separator, and the retaining washer or the cathode mix, and at the joint between the carbon rod and the retaining washer or cathode mix, and in intimate contact with appropriate ones of those elements, is critical to the success of this invention. The inventors have experimented with using various materials at the top of the inner chamber 34, as taught by Marsal, and on the asphalt seal washer in place of the asphalt seal 32. Even when using the materials disclosed herein for use for the seal material 26, the results were unsatisfactory because oxygen did by-pass the seals and attack the zinc can. Only by having intimate surface-to-surface contact between the seal material and the surfaces being protected is the seal member effective to accomplish the objectives of the invention.

In some embodiments, the retaining washer 24 is not used. In such case, the seal member 26 is disposed directly on the cathode mix 14 instead of on the retaining washer. Its position with respect to the carbon rod and the separator remain unchanged, the seal member 26 extending from the joint between the rod and the cathode mix, across the top of the cathode mix, across the joint between the cathode mix and the separator, and across substantially the entire inner surface of the separator extending above the cathode.

In the preferred embodiments, the retaining washer is used, however, in order to minimize the amount of material that is used to form seal member 26.

In some cases, the material of seal member 26 may not entirely cover the inner surface of the separator 16. Such incomplete coverage is acceptable where the liquid component of the material of seal member 26 flows across the remaining surface of the separator, or flows into interstices in the separator along that portion of the separator which does not have seal material on its inner surface, thus preventing electrolyte from rising above the retaining washer or cathode mix, in contact with the zinc can. Thus, the liquid component compensates somewhat for minor unevenness or incompleteness in initial distribution of the seal member material.

Figure 2:
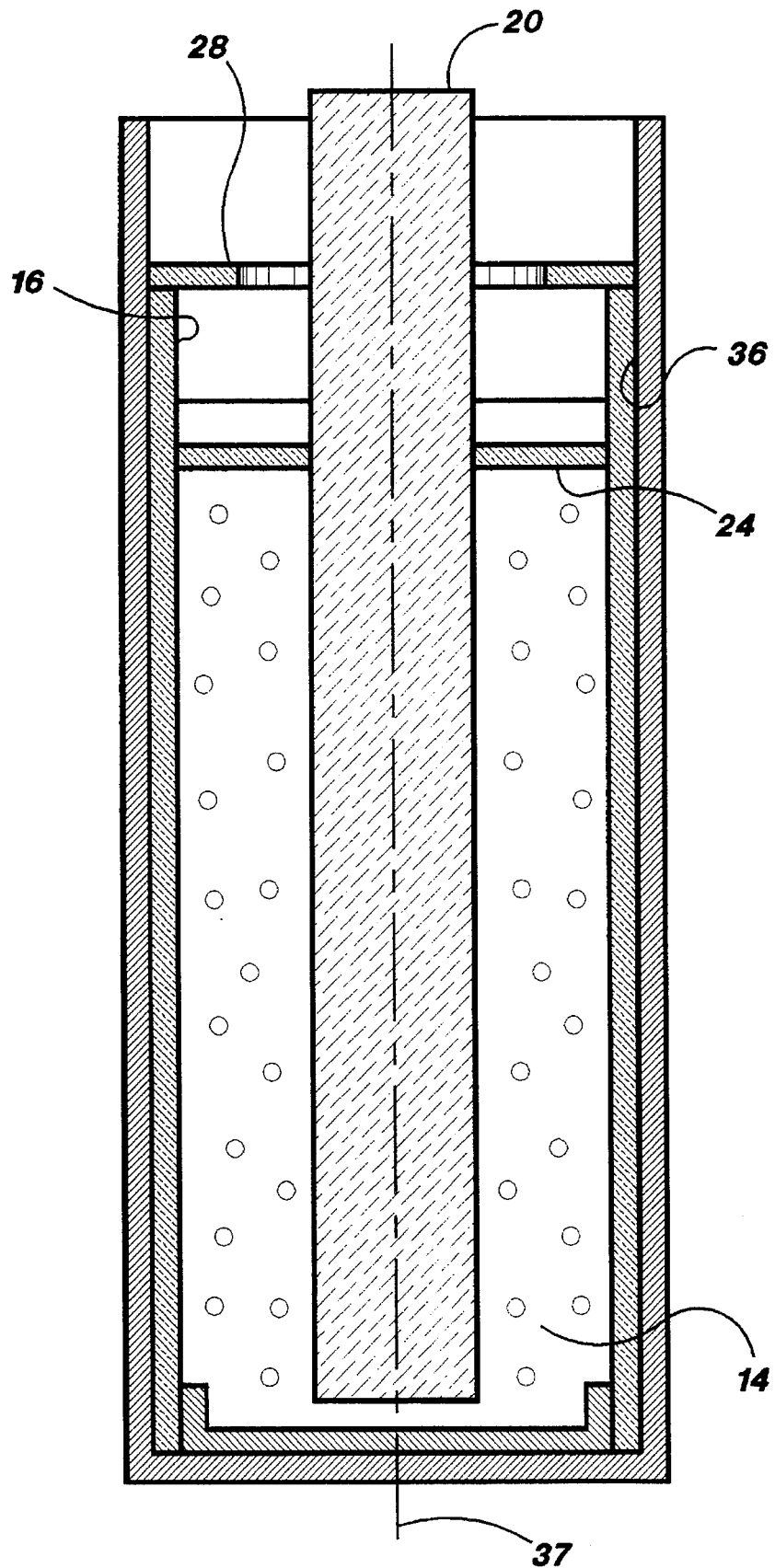
FIG. 2 shows a cross-section as in FIG. 1 before the inner and outer seals have been placed in the cell.
Figure 3:
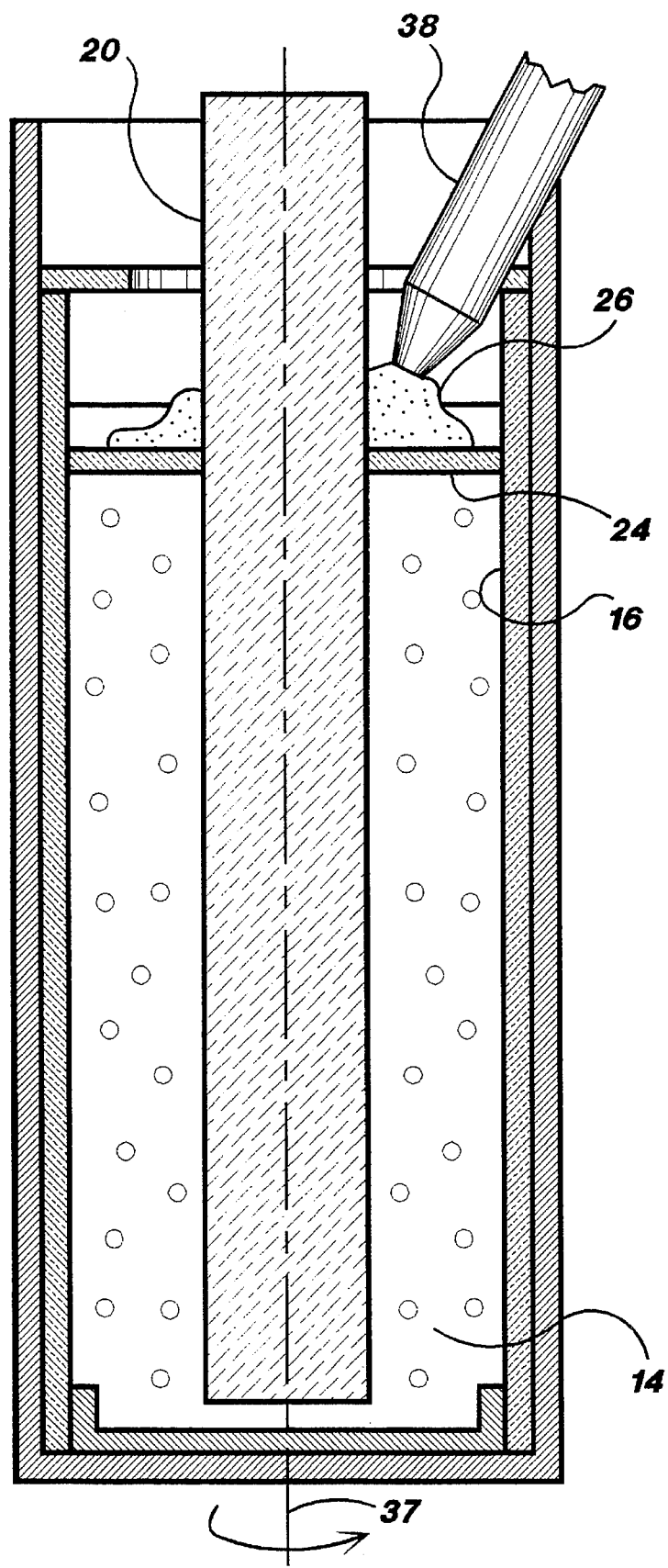
FIG. 3 shows a cross-section as in FIG. 2 with the inner seal in the process of being placed in the cell.

A preferred method of assembling a zinc chloride cell of the invention is as follows. An open-topped zinc can is provided. A separator, and a bottom cup, are inserted into the horizontally-orineted can. Splash shield 28 is installed. Manganese dioxide cathode mix is then inserted by pressure nozzle means into the still horizontally-oriented can. The retaining washer is then applied to the top of the cathode mix. The current collector carbon rod is then inserted into the cathode mix (the end cap 22 being placed thereupon later), through the retaining washer, whereupon the partially assembled cell appears as depicted in FIG. 2. The can and contents are then rotated while still horizontally-oriented, about vertical axis 37, at about 465 rpm while material for seal member 26 is dispensed at a temperature of about 110–115 degrees F., through nozzle 38 against the carbon rod 20, about the circumference of the rod, at the joint between the carbon rod and the retaining washer 24, as shown in FIG. 3.

The speed of rotation of the can, as the seal material is dispensed, is fast enough that centrifugal force causes the hot seal material to immediately spread outwardly over the surface of the retaining washer, across the joint between the retaining washer and the separator, and upwardly on that portion of the inner surface of the separator which extends above the cathode mix (and the retaining washer). Much slower speeds are contemplated to be satisfactory, especially if the cell is oriented vertically when the seal material is dispensed therewithin. The speed for any given set of conditions will, of course, depend on the viscosity of the seal material being dispensed, the surface characteristics of the corresponding retainer washer, cathode mix, and separator, whether the cell is oriented vertically or horizontally when the seal material is dispensed therewithin, and other factors. In fact, if the seal material is dispensed in the cell while it is vertically oriented, no rotation of the can may be required if enough seal material is disposed therewithin to cover the top edge of the separator, and provided that the inner chamber is not completely filled with seal material.

It is critical that the joints, between the carbon rod and the retaining washer, and between the separator and the retaining washer, be filled With seal material, to prevent oxygen from by-passing the seal member at the respective joints. When dispensing of the seal material is completed, the nozzle is withdrawn and rotation of the cell is stopped.

Figure 4:
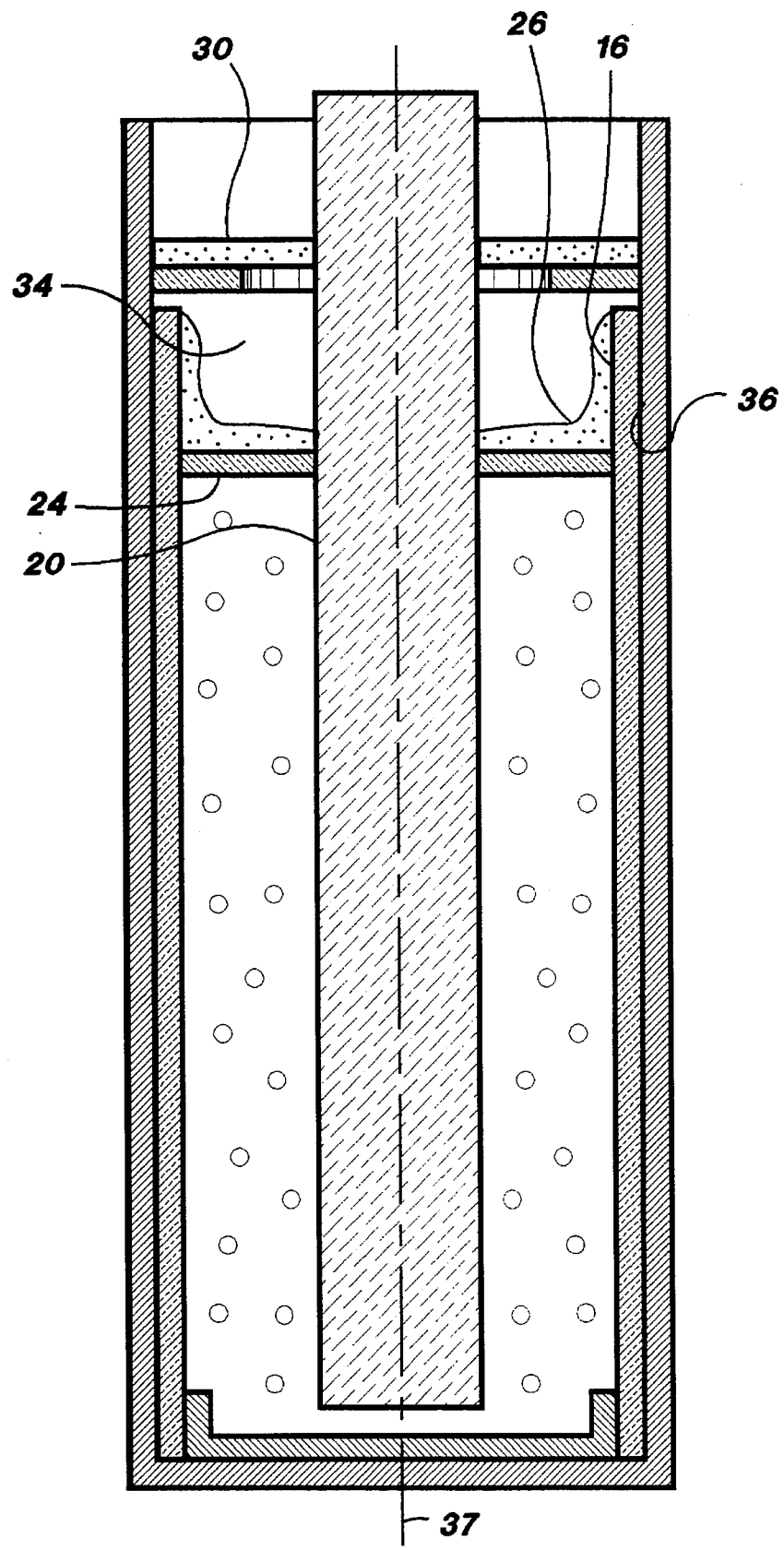
FIG. 4 shows a cross-section as in FIG. 3, with the inner seal, and the outer asphalt seal washer in place, but before placement of the asphalt seal.

Cooling air is directed onto the seal material to solidify, and fix in position, the seal member 26. The asphalt seal washer 30 is then placed over the splash shield 28. The end cap 22 is then placed on the end of the current collector rod 20. The cell then appears as depicted in FIG. 4. Finally, hot asphalt is dispensed onto the asphalt seal washer 30, between the inside of the can wall and the carbon rod and end cap 22. The asphalt is then cooled, providing the outer asphalt seal 32 of the cell. Assembly of the cell is thus completed, whereupon the cell appears as shown in FIG. 1.

EXAMPLE

A zinc chloride cell of the invention was made as follows. An open-topped, battery-grade zinc can, height about 3.4 inches, outside diameter about 1.25 inches, was provided. A starch coated kraft paper separator was then inserted into a horizontally-oriented can, followed by insertion of a waxed kraft paper bottom cup. Manganese dioxide cathode mix, according to the above formula, was inserted by pressure nozzle means into the horizontally-oriented can. The retaining washer was then applied to the top of the cathode mix. The current collector carbon rod 20 was then inserted into the cathode mix, through the retaining washer, whereupon the partially assembled cell appeared as depicted in FIG. 2. The horizontally-oriented can and contents were then rotated at about 465 rpm about the longitudinal axis 37 of the can while 0.85 gram of Fonoline® Yellow petrolatum, from Witco Chemical Company, was dispensed at 650 psi through a nozzle at 112–115 degrees F. against the joint formed by the retaining washer 24 and the carbon rod 20. Less than 0.5 second elapsed between the time that the manganese dioxide cathode mix was placed in the can and the time the material for the seal member 26 was dispensed onto the carbon rod and retaining washer.

Cooling air was then injected onto the seal material, to cool and solidify the seal material, thereby forming the seal member 26.

The asphalt seal washer was then emplaced, end cap 22 then being placed on the end of carbon rod 20, liquid asphalt then being emplaced between the can wall and the carbon rod, and cooled. The thus-assembled 1.5 volt cell then appeared as shown in FIG. 1.

The above example is described with respect to a cell which is used in a multiple-cell battery. The inner seal members of this invention are also readily adapted for use in otherwise conventional single cell batteries, such as the well-known AAA size, AA size, C size, and D size batteries.

It is important that the seal material be dispensed, and otherwise placed in the cell soon enough after the cathode mix is emplaced in the cell that the seal material can permeate the separator above the cathode mix before the electrolyte from the cathode mix is able to permeate the separator at that location. If placement of the seal member 26 is delayed, electrolyte will permeate the separator above the cathode mix, and seal material applied later will not be able to permeate the separator because of the immiscibility of the aqueous electrolyte and the oil-based seal member. Such situation provides potential for oxygen to react with electrolyte at the surface of the zinc can if the oxygen can reach the zinc surface. If electrolyte is allowed to be absorbed into the separator adjacent the zinc can and above the cathode mix, oxygen does reach the zinc surface, if only through the electrolyte.

Batteries were then made by wiring in series four of the cells so made according to the EXAMPLE, to make nominal 6-volt lantern batteries, and the batteries so made were tested against batteries using control cells that were identical except for use of the seal member 26.

Four-cell, 6-volt zinc chloride batteries were made using cells of the invention, and tested against control batteries (no seal member 26), with results as follows. In all cases, the seal member 26 was a petrolate. In each case, the control battery (no seal member) was identical to the test battery except for the inner seal member 26. Table 1 reports measured amperage under different conditions of storage and partial discharges.

TABLE 1

|  | Inner Seal | No Inner Seal |
| --- | --- | --- |
| 6-weeks store, Room Temp. | 3.5 Amp | 0.3 Amp. |
|  | 3.7 | 0.1 |
| 6-weeks Store, 113 degrees F. | 4.6 | 0.1 |
|  | 4.1 | 0.4 |
| 6-months Store, 113 degrees F. | 4.1 | 0.9 |
|  | 3.6 | 1.3 |
|  | 3.2 | 1.7 |
| Partial Dischg, then 12-wks Store, Room Temp. | 3.4 | 3.1 |
|  | 3.4 | 3.3 |
|  | 3.0 | 3.4 |
| Partial Dischg, then 12-wks Store, 113 Degrees F. | 3.6 | 0.8 |
|  | 3.4 | 1.8 |

It has been ascertained that lantern battery output below about 5 volts or 2 amperes is noticeably less desirable to consumers than voltages and currents of about 5 volts or 2 amperes or more, respectively. Table 2 shows the time, in hours, that the lantern battery supported the stated load before reaching a 4.4 volt end point.

TABLE 2

|  | Inner Seal | No Inner Seal |
|---|---|---|
| 6.8 ohm, 30 M/H | 1.5 hr | 1.0 hr |
| 9.1 ohm, 30 M/H | 4.8 hr | 4.8 hr |
| 16 ohm, 30 M/H | 16.8 hr | 13.3 hr |
| 33 ohm, 30 M/H | 44.1 hr | 43.9 hr |

Figure 5:
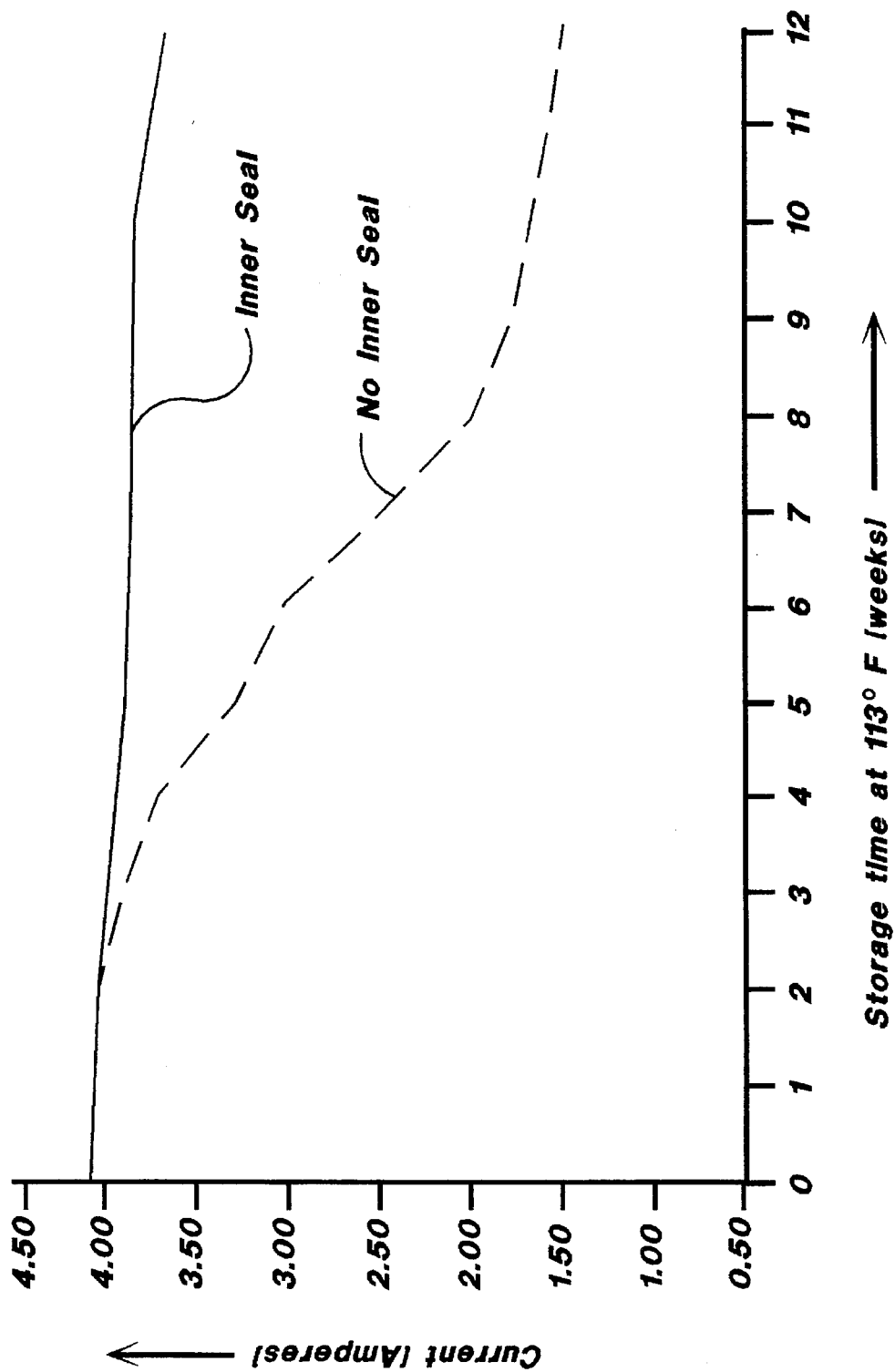
FIGS. 5 and 6 show graphical depictions of comparative amperages of 6-Volt 4-cell lantern batteries with and without the inner seals of the invention.
Figure 6:
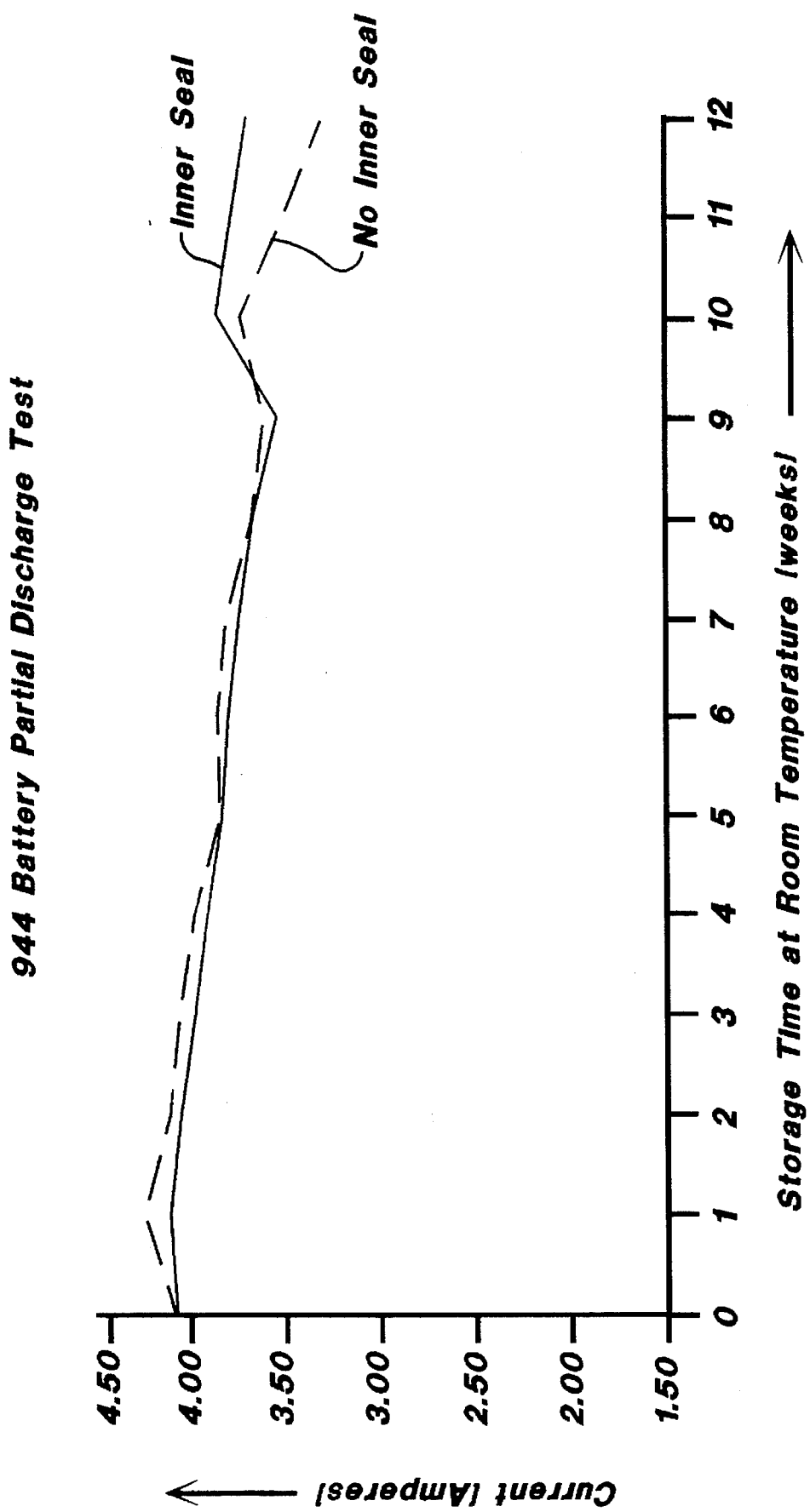

Table 3 shows the amperage of the battery after partial discharge, followed by storage, either at room temperature (e.g. 70 degrees F.) or at 113 degrees F., for the time shown. The numbers shown in Table 3 are depicted graphically in FIGS. 5 and 6.

TABLE 3

| | Storage At Room Temp | | Storage At 113 Degrees F. | |
|---|---|---|---|---|
| | Inner Seal | No Inner Seal | Inner Seal | No Inner Seal |
| Initial | 4.2 Amp | 4.2 Amp | 4.1 Amp | 4.2 Amp |
| 2 Weeks | 4.1 | 4.1 | 4.1 | 4.1 |
| 5 Weeks | 3.9 | 3.9 | 4.2 | 3.1 |
| 7 Weeks | 3.8 | 3.7 | 4.1 | 2.3 |
| 10 Weeks | 3.8 | 3.6 | 4.1 | 1.8 |
| 12 Weeks | 3.6 | 3.0 | 4.0 | 1.4 |

Figure 7:
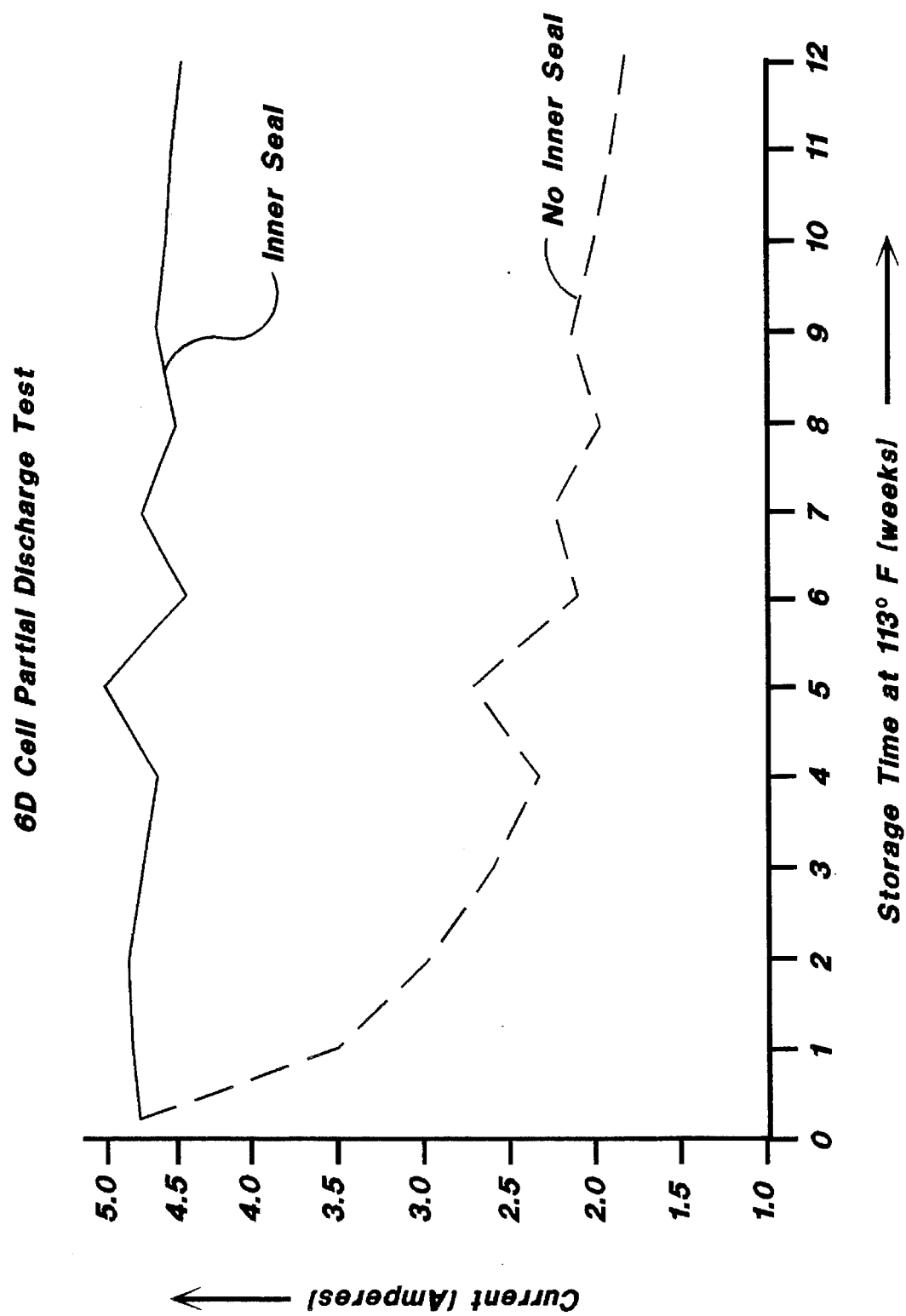
FIGS. 7 and 8 show graphical depictions of comparative amperages of D-Size batteries with and without the inner seals of the invention.
Figure 8:
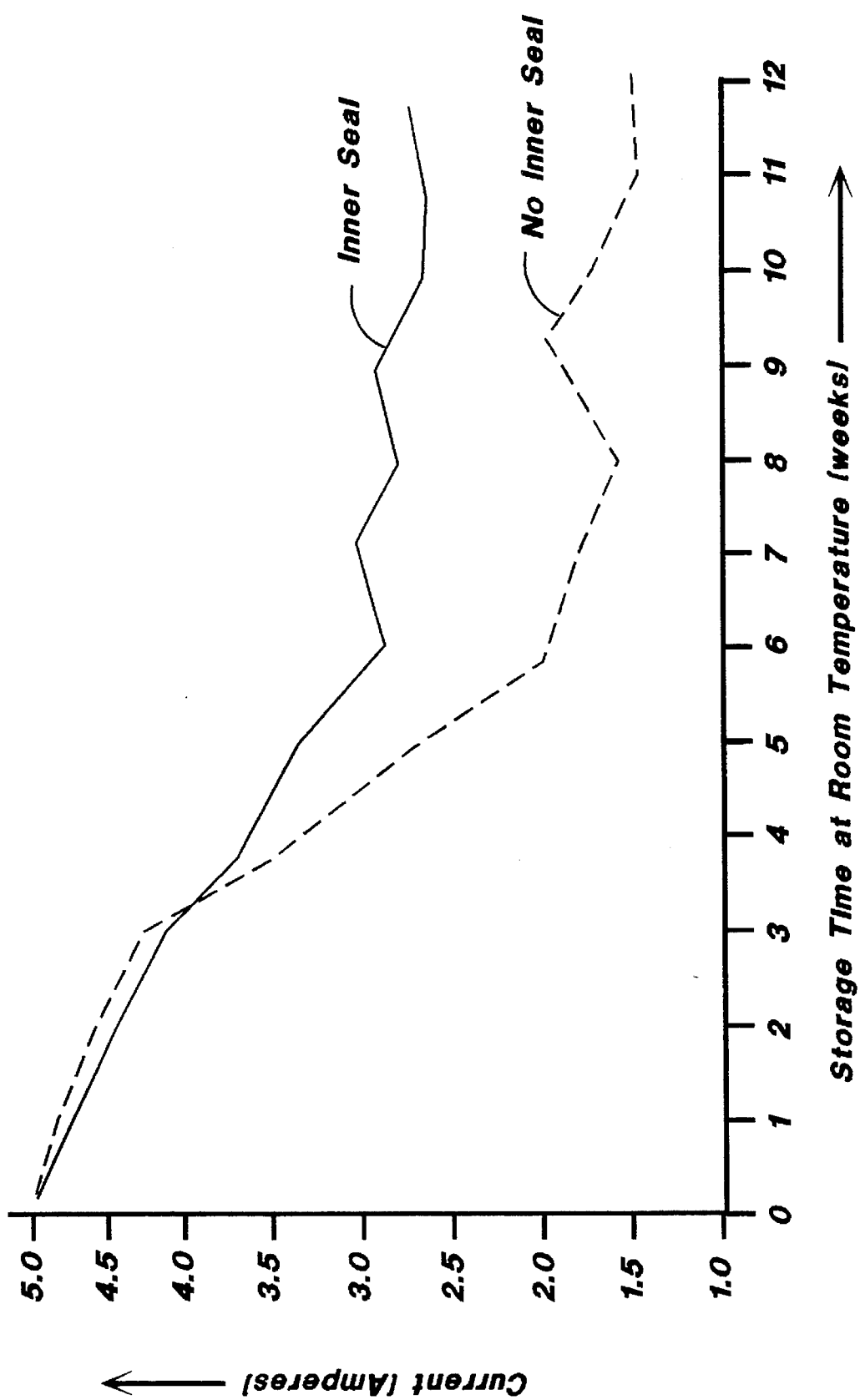

Table 4 shows the amperage of single cell D Size batteries after partial discharge, then storage under the conditions shown. The numbers shown in Table 4 are depicted graphically in FIGS. 7 and 8.

TABLE 4

| | Storage At Room Temp | | Storage At 113 Degrees F. | |
|---|---|---|---|---|
| | Inner Seal | No Inner Seal | Inner Seal | No Inner Seal |
| Initial | 5.0 Amp | 4.9 Amp | 4.8 Amp | 4.8 Amp |
| 1 Week | 4.6 | 4.7 | 4.9 | 3.5 |
| 2 Weeks | 4.4 | 4.5 | 4.9 | 3.1 |
| 3 Weeks | 4.0 | 4.1 | 4.8 | 2.7 |
| 4 Weeks | 3.5 | 3.4 | 4.6 | 2.4 |
| 5 Weeks | 3.0 | 2.9 | 5.0 | 2.7 |
| 6 Weeks | 2.7 | 2.1 | 4.5 | 2.1 |
| 7 Weeks | 3.0 | 2.1 | 4.8 | 2.4 |
| 8 Weeks | 2.7 | 1.8 | 4.5 | 2.0 |
| 9 Weeks | 2.9 | 1.9 | 4.7 | 2.1 |
| 10 Weeks | 2.8 | 1.8 | 4.6 | 2.0 |
| 11 Weeks | 2.4 | 1.5 | 4.6 | 1.9 |
| 12 Weeks | 2.5 | 1.5 | 4.5 | 1.8 |

Table 5 shows the results of varying the relative weight percentages of paraffin wax and paraffin oil in the composition of the inner seal member 26. Twelve zinc chloride lantern batteries having inner seal members of the compositions indicated in Table 5 were made, with six such batteries being stored for twelve weeks at a room temperature of about 70° F., and six such batteries being stored for twelve weeks at a temperature of about 113° F. At the end of the twelve week storage period the batteries were removed from storage and the respective currents measured under constant 9.1 ohm loads.

TABLE 5

| Ratio of Paraffin Wax to Paraffin Oil (weight percent) | Room Temp. Current/ No. Failures | High Temp. Current/ No. Failures |
|---|---|---|
| Control (No inner seal) | 1.27A/6 | 0.75A/6 |
| 100% Paraffin Wax Control | 3.03A/0 | 0.58A/6 |
| Petrolatum | 2.61A/0 | 2.68A/1 |
| 90% Par. Wax/10% Par. Oil | 2.76A/0 | 1.87A/3 |
| 80% Par. Wax/20% Par. Oil | 2.81A/0 | 1.49A/3 |
| 70% Par. Wax/30% Par. oil | 3.23A/0 | 1.33A/3 |
| 60% Par. Wax/40% Par. Oil | 3.57A/0 | 2.01A/3 |
| 50% Par. Wax/50% Par. Oil | 3.22A/0 | 1.65A/3 |
| 40% Par. Wax/60% Par. Oil | 3.11A/0 | 1.59A/3 |
| 30% Par. Wax/70% Par. Oil | 3.17A/0 | 1.69A/3 |
| 20% Par. Wax/80% Par. Oil | 2.83A/0 | 1.55A/3 |
| 10% Par. Wax/90% Par. Oil | 3.14A/0 | 1.80A/3 |
| 100% Par. Oil | 2.38A/0 | 1.59A/3 |

Table 5 shows that all batteries having inner seal members, regardless of the composition thereof, perform better than control batteries having no inner seal members. Table 5 also shows that at high temperature batteries having inner seals having even a small amount of the first liquid component perform substantially better than the two types of control batteries having either no first liquid component in the inner seal thereof or no inner seal.

In zinc carbon cells of the invention, the electrolyte can be zinc chloride, ammonium chloride, or a combination of zinc chloride and ammonium chloride.

The hydrocarbon molecules in the solid or semi-solid component of the seal material are preferably straight chains with a few branches or naphthene rings.

Except where otherwise indicated, as used herein, "room temperature" means ambient temperature between 50 and 100 degrees F.

The invention has been described above with respect to a zinc chloride cell, having a zinc can anode, a manganese oxide cathode, zinc chloride electrolyte, and a carbon rod current collector. The invention is also useful with magnesium batteries and aluminum batteries.

A magnesium battery has a magnesium can anode, manganese dioxide cathode, and magnesium perchlorate $(Mg(ClO_4)_2)$ electrolyte.

An aluminum battery has an aluminum can anode, manganese dioxide cathode, and aluminum chloride $(AlCl_3)$ electrolyte.

Thus, the invention provides a novel interior seal, in the inner chamber of the cell, which provides a superior barrier to loss of moisture from the cell, and a superior barrier to oxygen ingress into the cell.

The invention further provides an interior seal which either covers, or preferably wicks into, the separator above the retaining washer, thus preventing ingress of oxygen through the separator, to the surface of the metal can, and also preventing upward advance of the electrolyte through the separator adjacent the can wall.

The invention yet further provides an interior seal compound and seal having a first liquid component which covers or wicks into the separator and a second semi-solid component which fixes the position of the compound in the inner chamber on the retaining washer (or cathode mix) and the separator.

The invention still yet further provides an interior seal compound and seal wherein the liquid and semi-solid components have such an affinity for each other that the immobility of the semi-solid component retards the mobility of the liquid component, and thus limits substantially the zone of migration of the liquid component essentially to covering or penetrating the retaining washer and covering or penetrating the separator above the retaining washer or cathode mix.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. An electrochemical cell, comprising:
   (a) an anode comprising a metal can having a top;
   (b) a cathode comprising a quantity of a cathode mix in said metal can, and a current collector in physical contact with said cathode mix, said current collector having a top and said cathode mix having a top;
   (c) a separator disposed between said cathode mix and said metal can;
   (d) one or more top closure members overlying, and spaced from, said cathode mix, an inner chamber being disposed between said one or more top closure members and said cathode mix; and
   (e) an inner seal member comprising seal material extending over said top of said cathode mix, and onto, into, and through said separator, above said cathode mix.

2. An electrochemical cell as in claim 1, said inner seal member extending over the entire said top surface of said cathode mix.

3. An electrochemical cell as in claim 1, said separator having an inner surface, said inner seal member extending over substantially the entire portion of said inner surface of said separator which extends above said cathode mix.

4. An electrochemical cell as in claim 1, and including a retaining washer overlying said cathode mix, and disposed between said cathode mix and said inner seal member.

5. An electrochemical cell as in claim 4, and including a first joint between said current collector and said retaining washer, and a second joint between said retaining washer and said separator, said inner seal member extending over said retaining washer, and over both of said first and second joints.

6. An electrochemical cell as in claim 1 wherein said cathode mix comprises manganese dioxide.

7. An electrochemical cell as in claim 6 wherein said manganese dioxide is selected from the group consisting of electrolytic manganese dioxide, chemical manganese dioxide, metallurgical grade manganese dioxide, and mixtures thereof.

8. An electrochemical cell as in claim 1, wherein said cell further comprises zinc chloride electrolyte, and wherein said metal can comprises zinc.

9. An electrochemical cell as in claim 1, wherein said cell further comprises ammonium chloride electrolyte, and wherein said metal can comprises zinc.

10. An electrochemical cell as in claim 1, wherein said cell further comprises, as an electrolyte, a mixture of zinc chloride and ammonium chloride, and wherein said metal can comprises zinc.

11. An electrochemical cell as in claim 1 wherein said anodic metal can comprises one of magnesium and primarily magnesium, said cathode mix comprises manganese dioxide, and wherein said cell comprises, as an electrolyte, magnesium perchlorate.

12. An electrochemical cell as in claim 1 wherein said anodic metal can comprises one of aluminium and primarily aluminum, said cathode mix comprises manganese dioxide, and wherein said cell comprises, as an electrolyte, aluminum chloride.

13. An electrochemical cell as in claim 1 wherein said current collector comprises carbon.

14. An electrochemical cell as in claim 1 wherein said separator comprises paper at about 30 to about 70 pounds per 3000 square foot ream.

15. An electrochemical cell as in claim 4 wherein said inner seal member, when applied to surfaces of said retaining washer, said current collector rod, and said separator, at up to 140 degrees F., remains in full contact with said surfaces upon cooling of said seal member to room temperature.

16. An electrochemical cell as in claim 1, said seal material comprising a liquid component which is sufficiently mobile at room temperature that said liquid component can bleed through 50 pound per 3000 square foot ream kraft paper, at a rate of about ⅛ inch within 12 hours after being placed in said electrochemical cell.

17. An electrochemical cell as in claim 15, said liquid component of said seal member comprising a first component, said seal material further including a second solid or semi-solid component, said second component being immobile at room temperature, said first liquid component having sufficient affinity for said second component that the immobility of said second component, in the fraction used, is effective to limit the mobility of said first component.

18. An electrochemical cell as in claim 1, said seal material consisting essentially of paraffin oil.

19. An electrochemical cell as in claim 4, said current collector rod comprising carbon, and said seal material consisting essentially of petrolatum.

20. An electrochemical cell, comprising:
   (a) an anode comprising a metal can having a top;
   (b) a cathode comprising a quantity of a cathode mix in said metal can, and a current collector in physical contact with said cathode mix, said current collector having a top and said cathode mix having a top;
   (c) a separator disposed between said cathode mix and said metal can;
   (d) one or more top closure members overlying, and spaced from, said cathode mix, an inner chamber being disposed between said one or more top closure members and said cathode mix; and
   (e) an inner seal member extending over said cathode mix, and onto said separator above said cathode mix, said inner seal member comprising a composition having about 0.5% to about 100% by weight of a first mobile liquid hydrocarbon component effective to penetrate said separator, and about 99.5% to about 0% by weight of a second solid or semi-solid hydrocarbon component, said second component being immobile at room temperature, said first component having sufficient affinity for said second component that the immobility of said second component, in the fraction used, is effective to limit the mobility of said first component.

21. An electrochemical cell as in claim 20 wherein the immobility of said second component is effective to limit the mobility of said first component to said top of said cathode mix and said separator.

22. An electrochemical cell as in claim 20, said inner seal member extending over the entire said top surface of said cathode mix.

23. An electrochemical cell as in claim 20, said separator having an inner surface, said inner seal member extending over substantially the entire portion of said inner surface of said separator which extends above said cathode mix.

24. An electrochemical cell as in claim 20, and including a retaining washer overlying said cathode mix, and disposed between said cathode mix and said inner seal member.

25. An electrochemical cell as in claim 24, and including a first joint between said current collector rod and a said retaining washer, and a second joint between said retaining washer and said separator, said inner seal member extending over said retaining washer, and over both of said first and second joints.

26. An electrochemical cell as in claim 20 wherein said cathode mix comprises manganese dioxide.

27. An electrochemical cell as in claim 26 wherein said manganese dioxide is selected from the group consisting of electrolytic manganese dioxide, chemical manganese dioxide, metallurgical grade manganese dioxide, and mixtures thereof.

28. An electrochemical cell as in claim 20, wherein said cell further comprises zinc chloride electrolyte, and wherein said metal can comprises zinc.

29. An electrochemical cell as in claim 20, wherein said cell further comprises ammonium chloride electrolyte, and wherein said metal can comprises zinc.

30. An electrochemical cell as in claim 20, wherein said cell further comprises, as an electrolyte, a mixture of zinc chloride and ammonium chloride, and wherein said metal can comprises zinc.

31. An electrochemical cell as in claim 20 wherein said metal can comprises one of magnesium and primarily magnesium, said cathode mix comprises manganese dioxide, and wherein said cell comprises, as an electrolyte, magnesium perchlorate.

32. An electrochemical cell as in claim 20 wherein said metal can comprises one of aluminum and primarily aluminum, said cathode mix comprises manganese dioxide, and wherein said cell comprises, as an electrolyte, aluminum chloride.

33. An electrochemical cell as in claim 20 wherein said current collector rod comprises carbon.

34. An electrochemical cell as in claim 20 wherein said separator comprises paper at about 30 to about 70 pounds per 3000 square foot ream.

35. An electrochemical cell as in claim 24 wherein said inner seal member, when applied to surfaces of said retaining washer, said current collector rod, and said separator, at up to 140 degrees F., remains in full contact with said surfaces upon cooling of said seal member to room temperature.

36. An electrochemical cell as in claim 20, said first liquid component being sufficiently mobile at room temperature that said liquid component can bleed through 50 pound per 3000 square foot ream paper, at a rate of about ⅛ inch within 12 hours after being placed in said electrochemical cell.

37. An electrochemical cell as in claim 20, said seal material consisting essentially of paraffin oil.

38. An electrochemical cell as in claim 24, said current collector rod comprising carbon, and said seal material consisting essentially of petrolatum.

39. An electrochemical cell, comprising:
(a) an anode comprising a metal can having a top;
(b) a cathode comprising a quantity of a cathode mix in said metal can, and a current collector in physical contact with said cathode mix, said current collector having a top and said cathode mix having a top;
(c) a separator disposed between said cathode mix and said metal can;
(d) one or more top closure members overlying, and spaced from, said cathode mix, an inner chamber being disposed between said one or more top closure members and said cathode mix; and
(e) an inner seal member extending over said cathode mix, and over said separator above said cathode mix, said inner seal member comprising a composition having about 0.5% to about 100% by weight of a first liquid hydrocarbon component and about 99.5% to about 0% by weight of a second solid or semi-solid hydrocarbon component, said first liquid component having a viscosity of between about 35 SUS and 360 SUS at 100° F.

40. An electrochemical cell as in claim 39, said second component having a viscosity greater than the viscosity of said first component when both components are at the same temperature, said second component having a viscosity of at least 35 SUS at 210° F.

41. An electrochemical cell as in claim 39, said inner seal member extending over the entire said top surface of said cathode mix.

42. An electrochemical cell as in claim 39, said separator having an inner surface, said inner seal member extending over substantially the entire portion of said inner surface of said separator which extends above said cathode mix.

43. An electrochemical cell as in claim 39, and including a retaining washer overlying said cathode mix, and disposed between said cathode mix and said inner seal member.

44. An electrochemical cell as in claim 43, and including a first joint between said current collector rod and a said retaining washer, and a second joint between said retaining washer and said separator, said inner seal member extending over said retaining washer, and over both of said first and second joints.

45. An electrochemical cell as in claim 39 wherein said cathode mix comprises manganese dioxide.

46. An electrochemical cell as in claim 45 wherein said manganese dioxide is selected from the group consisting of electrolytic manganese dioxide, chemical manganese dioxide, metallurgical grade manganese dioxide, and mixtures thereof.

47. An electrochemical cell as in claim 39 wherein said cell further comprises zinc chloride electrolyte, and wherein said metal can comprises zinc.

48. An electrochemical cell as in claim 39 wherein said cell further comprises ammonium chloride electrolyte, and wherein said metal can comprises zinc.

49. An electrochemical cell as in claim 39 wherein said cell further comprises, as an electrolyte, a mixture of zinc chloride and ammonium chloride, and wherein said metal can comprises zinc.

50. An electrochemical cell as in claim 39 wherein said metal can comprises one of magnesium and primarily magnesium, said cathode mix comprises manganese dioxide, and wherein said cell comprises, as an electrolyte, magnesium perchlorate.

51. An electrochemical cell as in claim 39 wherein said metal can comprises one of aluminum and primarily aluminum, said cathode mix comprises manganese dioxide, and wherein said cell comprises, as an electrolyte, aluminum chloride.

52. An electrochemical cell as in claim 39 wherein said current collector comprises primarily carbon.

53. An electrochemical cell as in claim 39 wherein said separator comprises paper at about 30 to about 70 pounds per 3000 square foot ream.

54. An electrochemical cell as in claim 45 wherein said inner seal member, when applied to surfaces of said retaining washer, said current collector rod, and said separator, at up to 140 degrees F., remains in full contact with said surfaces upon cooling of said seal member to room temperature.

55. An electrochemical cell as in claim 39, said first liquid component being sufficiently mobile at room temperature that said liquid component can bleed through 50 pound per 3000 square foot ream kraft paper, at a rate of about ⅛ inch within 12 hours after being placed in said electrochemical cell.

56. An electrochemical cell as in claim 39, said seal material consisting essentially of paraffin oil.

57. An electrochemical cell as in claim 39, said current collector rod comprising carbon, and said seal material consisting essentially of petrolatum.

58. An electrochemical cell, comprising:

(a) an anode comprising a metal can having a top;

(b) a cathode comprising a quantity of a cathode mix in said metal can, and a current collector in physical contact with said cathode mix, said current collector having a top and said cathode mix having a top;

(c) a separator disposed between said cathode mix and said metal can;

(d) one or more top closure members overlying, and spaced from, said cathode mix, an inner chamber being disposed between said one or more top closure members and said cathode mix; and (e) an inner seal member extending over said cathode mix, and over said separator above said cathode mix, said inner seal member comprising a sealant composition comprising a first mobile liquid hydrocarbon component having a first molecular weight, and a second immobile solid or semi-solid hydrocarbon component having a second molecular weight higher than said first molecular weight, said first component having sufficient affinity for said second component that the immobility of said second component is effective to limit the mobility of said first component.

59. An electrochemical cell as in claim 58 wherein the immobility of said second component is effective to limit the mobility of said first component to (i) said top of said cathode mix and (ii) said separator.

60. An electrochemical cell as in claim 58, said inner seal member extending over the entire said top surface of said cathode mix.

61. An electrochemical cell as in claim 58, said separator having an inner surface, said inner seal member extending over substantially the entire portion of said inner surface of said separator which extends above said cathode mix.

62. An electrochemical cell as in claim 58, and including a retaining washer overlying said cathode mix, and disposed between said cathode mix and said inner seal member.

63. An electrochemical cell as in claim 62, and including a first joint between said current collector and a said retaining washer, and a second joint between said retaining washer and said separator, said inner seal member extending over said retaining washer, and over both of said first and second joints.

64. An electrochemical cell as in claim 58 wherein said cathode mix comprises manganese dioxide.

65. An electrochemical cell as in claim 64 wherein said manganese dioxide is selected from the group consisting of electrolytic manganese dioxide, chemical manganese dioxide, metallurgical grade manganese dioxide, and mixtures thereof.

66. An electrochemical cell as in claim 58 wherein said cell further comprises zinc chloride electrolyte, and wherein said metal can comprises zinc.

67. An electrochemical cell as in claim 58 wherein said cell further comprises ammonium chloride electrolyte, and wherein said metal can comprises zinc.

68. An electrochemical cell as in claim 58 wherein said cell further comprises, as an electrolyte, a mixture of zinc chloride and ammonium chloride, and wherein said metal can comprises zinc.

69. An electrochemical cell as in claim 58 wherein said metal can comprises one of magnesium and primarily magnesium, said cathode mix comprises manganese dioxide, and wherein said cell comprises, as an electrolyte, magnesium perchlorate.

70. An electrochemical cell as in claim 58 wherein said metal can comprises one of aluminum and primarily aluminum, said cathode mix comprises manganese dioxide, and wherein said cell comprises, as an electrolyte, aluminum chloride.

71. An electrochemical cell as in claim 58 wherein said current collector comprises primarily carbon.

72. An electrochemical cell as in claim 58 wherein said separator comprises paper at about 30 to about 70 pounds per 3000 square foot ream.

73. An electrochemical cell as in claim 62 wherein said inner seal member, when applied to surfaces of said retaining washer, said current collector rod, and said separator, at up to 140 degrees F., remains in full contact with said surfaces upon cooling of said seal member to room temperature.

74. An electrochemical cell as in claim 58, said first liquid component being sufficiently mobile at room temperature that said liquid component can bleed through 50 pound per 3000 square foot ream kraft paper, at a rate of ⅛ inch within 12 hours after being placed in said electrochemical cell.

75. An electrochemical cell as in claim 58, said seal material consisting essentially of paraffin oil.

76. An electrochemical cell as in claim 62, said current collector rod comprising carbon, and said seal material consisting essentially of petrolatum.

77. An electrochemical cell, comprising:

(a) an anode comprising a metal can having a top;

(b) a cathode comprising a quantity of a cathode mix in said metal can, and a current collector in physical contact with said cathode mix, said current collector having a top and said cathode mix having a top;

(c) a separator disposed between said cathode mix and said metal can;

(d) one or more top closure members overlying, and spaced from, said cathode mix, and thereby creating an inner chamber between said one or more top closure members and said cathode mix; and (e) an inner seal member extending over said cathode mix, and over said separator above said cathode mix, said inner seal member comprising a composition comprising a first mobile liquid hydrocarbon component comprising predominantly one of hydrocarbon molecules and fatty ester acid molecules having 12–30 carbon atoms, and a second immobile solid or semi-solid component comprising predominantly one of hydrocarbon molecules and fatty acid ester molecules having 25–150 carbon atoms.

78. An electrochemical cell as in claim 77, said inner seal member extending over substantially the entire top surface of said cathode mix.

79. An electrochemical cell as in claim 77, said separator having an inner surface, said inner seal member extending over substantially the entire portion of said inner surface of said separator which extends above said cathode mix.

80. An electrochemical cell as in claim 77, and including a retaining washer overlying said cathode mix, and disposed between said cathode mix and said inner seal member.

81. An electrochemical cell as in claim 80, and including a first joint between said current collector and a said retaining washer, and a second joint between said retaining washer and said separator, said inner seal member extending over said retaining washer, and over both of said first and second joints.

82. An electrochemical cell as in claim 77 wherein said cathode mix comprises manganese dioxide.

83. An electrochemical cell as in claim 82 wherein said manganese dioxide is selected from the group consisting of electrolytic manganese dioxide, chemical manganese dioxide, metallurgical grade manganese dioxide, and mixtures thereof.

84. An electrochemical cell as in claim 77 wherein said cell further comprises zinc chloride electrolyte, and wherein said metal can comprises zinc.

85. An electrochemical cell as in claim 77 wherein said cell further comprises ammonium chloride electrolyte, and wherein said metal can comprises zinc.

86. An electrochemical cell as in claim 77 wherein said cell further comprises, as an electrolyte, a mixture of zinc chloride and ammonium chloride, and wherein said metal can comprises zinc.

87. An electrochemical cell as in claim 77 wherein said metal can comprises one of magnesium and primarily magnesium, said cathode mix comprises manganese dioxide, and wherein said cell comprises, as an electrolyte, magnesium perchlorate.

88. An electrochemical cell as in claim 77 wherein said metal can comprises one of aluminum and primarily aluminum, said cathode mix comprises manganese dioxide, and wherein said cell comprises, as an electrolyte, aluminum chloride.

89. An electrochemical cell as in claim 77 wherein said current collector comprises primarily carbon.

90. An electrochemical cell as in claim 77 wherein said separator comprises paper at about 30 to about 70 pounds per 3000 square foot ream.

91. An electrochemical cell as in claim 77 wherein said inner seal member, when applied to surfaces of said retaining washer, said current collector, and said separator, at up to 140 degrees F., remains in full contact with said surfaces upon cooling of said seal member to room temperature.

92. An electrochemical cell as in claim. 77, said first liquid component being sufficiently mobile at room temperature that said liquid component can bleed through 50 pound per 3000 square foot ream kraft paper, at a rate of about ⅛ inch within 12 hours after being placed in said electrochemical cell.

93. An electrochemical cell as in claim 77, said seal material consisting essentially of paraffin oil.

94. An electrochemical cell as in claim 80, said current collector comprising carbon, and said seal material consisting essentially of petrolatum.

95. An electrochemical cell, comprising:

(a) an anode comprising a metal can having a top;

(b) a cathode comprising a quantity of a cathode mix in said metal can, and a current collector in physical contact with said cathode mix, said current collector having a top and said cathode mix having a top;

(c) a separator disposed between said cathode mix and said metal can;

(d) one or more top closure members overlying, and spaced from, said cathode mix, and thereby creating an inner chamber between said one or more top closure members and said cathode mix;

(e) an inner seal member extending over said cathode mix, and over said separator above said cathode mix, the composition of said inner seal member comprising a first liquid component and a second solid or semi-solid component, and being selected from the group consisting of paraffin oil, petrolatum, and compositions wherein said first component is selected from the group consisting of paraffin oil, lubricating oil, motor oil, linseed oil, butter, coconut oil, beef tallow, palm oil, soybean oil, palm kernel oil, cod liver oil, tung oil, cottonseed oil, corn oil, peanut oil, olive oil, safflower oil, and canola oil.

96. An electrochemical cell as in claim 95 wherein said second component is selected from the group consisting of paraffin wax, polyunsaturated vegetable oil, animal fats, gear grease, bitumen, and asphalt.

97. An electrochemical cell as in claim 95 wherein said first component is paraffin oil, said second component is selected from the group consisting of paraffin wax and asphalt.

98. An electrochemical cell as in claim 95, said inner seal member extending over the entire said top surface of said cathode mix.

99. An electrochemical cell as in claim 95, said separator having an inner surface, said inner seal member extending over substantially the entire portion of said inner surface of said separator which extends above said cathode mix.

100. An electrochemical cell as in claim 95, and including a retaining washer overlying said cathode mix, and disposed between said cathode mix and said inner seal member.

101. An electrochemical cell as in claim 100, and including a first joint between said current collector rod and a said retaining washer, and a second joint between said retaining washer and said separator, said inner seal member extending over said retaining washer, and over both of said first and second joints.

102. An electrochemical cell as in claim 95 wherein said cathode mix comprises manganese dioxide.

103. An electrochemical cell as in claim 102 wherein said manganese dioxide is selected from the group consisting of electrolytic manganese dioxide, chemical manganese dioxide, metallurgical grade manganese dioxide, and mixtures thereof.

104. An electrochemical cell as in claim 95 wherein said cell further comprises zinc chloride electrolyte, and wherein said metal can comprises zinc.

105. An electrochemical cell as in claim 95 wherein said cell further comprises ammonium chloride electrolyte, and wherein said metal can comprises zinc.

106. An electrochemical cell as in claim 95 wherein said cell further comprises, as an electrolyte, a mixture of zinc chloride and ammonium chloride, and wherein said metal can comprises zinc.

107. An electrochemical cell as in claim 95 wherein said metal can comprises one of magnesium and primarily magnesium, said cathode mix comprises manganese dioxide, and wherein said cell comprises, as an electrolyte, magnesium perchlorate.

108. An electrochemical cell as in claim 95 wherein said metal can comprises one of aluminum and primarily aluminum, said cathode mix comprises manganese dioxide, and wherein said cell comprises, as an electrolyte, aluminum chloride.

109. An electrochemical cell as in claim 95 wherein said current collector comprises primarily carbon.

110. An electrochemical cell as in claim 95 wherein said separator comprises paper at about 30 to about 70 pounds per 3000 square foot ream.

111. An electrochemical cell as in claim 100 wherein said inner seal member, when applied to surfaces of said retaining washer, said current collector, and said separator, at up to 140 degrees F., remains in full contact with said surfaces upon cooling of said seal member to room temperature.

112. Am electrochemical cell as in claim 95, said first liquid component being sufficiently mobile at room temperature that said liquid component can bleed through 50 pound per 3000 square foot ream kraft paper, at a rate of about ⅛ inch within 12 hours after being placed in said electrochemical cell.

113. An electrochemical cell as in claim 95, said seal material consisting essentially of paraffin oil.

114. An electrochemical cell as in claim 100, said current collector comprising carbon, and said seal material consisting essentially of petrolatum.

115. An electrochemical cell as in claim 1, wherein said electrochemical cell is of a size selected from the group consisting of AAA size, AA size, C size, and D size batteries.

116. An electrochemical cell as in claim 20, wherein said electrochemical cell is of a size selected from the group consisting of AAA size, AA size, C size, and D size batteries.

117. An electrochemical cell as in claim 39, wherein said electrochemical cell is of a size selected from the group consisting of AAA size, AA size, C size, and D size batteries.

118. An electrochemical cell as in claim 58, wherein said electrochemical cell is of a size selected from the group consisting of AAA size, AA size, C size, and D size batteries.

119. An electrochemical cell as in claim 77, wherein said electrochemical cell is of a size selected from the group consisting of AAA size, AA size, C size, and D size batteries.

120. An electrochemical cell as in claim 95, wherein said electrochemical cell is of a size selected from the group consisting of AAA size, AA size, C size, and D size batteries.

121. A battery made by wiring together, one of in series and in parallel, at least two electrochemical cells of claim 1.

122. A battery made by wiring together, one of in series and in parallel, at least two electrochemical cells of claim 20.

123. A battery made by wiring together, one of in series and in parallel, at least two electrochemical cells of claim 39.

124. A battery made by wiring together, one of in series and in parallel, at least two electrochemical cells of claim 58.

125. A battery made by wiring together, one of in series and in parallel, at least two electrochemical cells of claim 77.

126. A battery made by wiring together, one of in series and in parallel, at least two electrochemical cells of claim 95.

127. A method of making an electrochemical cell having a metal can anode comprising a metal can, said metal can anode having a bottom, an open top, and an inner circumference, said method comprising the steps of:

(a) placing a separator in said metal can, said separator having a top extending about said inner circumference of said metal can;

(b) placing, in said metal can, a cathode comprising a cathode mix and a current collector, said current collector having a length extending between said top and said bottom of said metal can, the cathode mix having a top below said top of said separator, a first joint being disposed between said cathode mix and said current collector, and a second joint being disposed between said cathode mix and said separator, both said current collector and said separator extending above the top of said cathode mix;

(c) placing a sealant material onto said current collector at said top of said cathode mix while rotating said metal can and the contents thereof about an axis extending along the length of said current collector, a bead of the sealant material thereby forming and being placed around said current collector; and (d) rotating said metal can about said axis sufficiently fast that said sealant material is distributed, by centrifugal force, across said cathode mix, across said second joint at said separator sheet, and onto said separator sheet above the top of said cathode mix.

128. A method as in claim 127 and including heating said sealant material to at least 110 degrees F. prior to placing said sealant material onto said current collector, and cooling said sealant material to room temperature within 10 seconds of said distribution of said sealant material by centrifugal force.

129. A method as in claim 128 and including cooling said sealant material to room temperature upon substantial completion of the immediate effect of the centrifugal force upon said sealant material.

130. A method as in claim 127, said separator having a circumference corresponding generally to the inner circumference of said metal can anode, and including, during said distribution of said sealant material by centrifugal force, distributing said sealant material to within about ⅛ inch of said top of said separator about said circumference of said separator.

131. A method as in claim 130 and including selecting said sealant material such that said sealant material can bleed to said top of said separator, at room temperature, within 12 hours of said distributing of said sealant material.

132. A method as in claim 127 and including placing a retaining washer in physical contact with said top of said cathode mix, and disposed between said cathode mix and said inner seal member.

133. A method as in claim 128 and including placing a retaining washer in physical contact with said top of said cathode mix, and disposed between said cathode mix and said inner seal member.

134. A method as in claim 129 and including placing a retaining washer in physical contact with said top of said cathode mix, and disposed between said cathode mix and said inner seal member.

135. A method as in claim 130 and including placing a retaining washer in physical contact with said top of said cathode mix, and disposed between said cathode mix and said inner seal member.

136. A method as in claim 131 and including placing a retaining washer in physical contact with said top of said cathode mix, and disposed between said cathode mix and said inner seal member.

137. A method of using an electrochemical cell, comprising discharging an electrochemical cell having an anode comprising a metal can having a top; a cathode comprising a quantity of a cathode mix in said metal can, and a current collector in physical contact with said cathode mix, said current collector having a top and said cathode mix having a top; a separator disposed between said cathode mix and said metal can; one or more top closure members overlying, and spaced from, said cathode mix, an inner chamber being disposed between said one or more top closure members and said cathode mix; and an inner seal member comprising seal material extending over said top of said cathode mix, and onto said separator, above said cathode mix.

* * * * *